United States Patent [19]

Kato et al.

[11] Patent Number: 4,587,188
[45] Date of Patent: May 6, 1986

[54] PHTHALOCYANINE PHOTOCONDUCTOR FOR ELECTROPHOTOGRAPHY

[75] Inventors: Masakazu Kato; Yoichi Nishioka; Katsuaki Kaifu, all of Tokyo, Japan

[73] Assignee: Oki Electric Industry Co., Ltd., Tokyo, Japan

[21] Appl. No.: 528,122

[22] Filed: Aug. 31, 1983

[30] Foreign Application Priority Data

| Sep. 6, 1982 | [JP] | Japan | 57-153982 |
| Sep. 6, 1982 | [JP] | Japan | 57-153981 |
| Jan. 14, 1983 | [JP] | Japan | 58-3297 |
| Jan. 20, 1983 | [JP] | Japan | 58-6723 |
| Jan. 21, 1983 | [JP] | Japan | 58-7381 |

[51] Int. Cl.$^4$ .................. G03G 5/06; G03G 5/14
[52] U.S. Cl. .................... 430/58; 430/78
[58] Field of Search ................. 430/58, 76, 78

[56] References Cited

U.S. PATENT DOCUMENTS

| 3,816,118 | 6/1974 | Byrne | 430/76 X |
| 3,895,944 | 7/1975 | Wiedemann et al. | 430/58 X |

FOREIGN PATENT DOCUMENTS

| 57-178245 | 11/1982 | Japan | 430/58 |
| 57-211149 | 12/1982 | Japan | 430/76 |

Primary Examiner—Roland E. Martin
Attorney, Agent, or Firm—Wenderoth, Lind & Ponack

[57] ABSTRACT

A photoconductor for electrophotography prepared by forming a carrier generation layer made from an organic photoconducting material on a conductive substrate and further forming a carrier transport layer on the carrier generation layer wherein the organic photoconducting material has a basic structure corresponding to phthalocyanine having the following general formula:

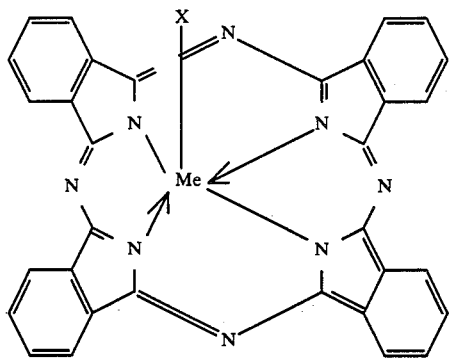

wherein a central metal Me is selected from the group consisting of indium, gallium and aluminum, and X is a combined halogen, and the above phthalocyanine is the one in which some hydrogen of benzene rings positioned around the phthalocyanine ring of the above basic structure are substituted by the same halogen with the combined halogen, and furthermore the above organic photoconducting material may be a mixture of the former phthalocyanine and the latter phthalocyanine.

7 Claims, 14 Drawing Figures

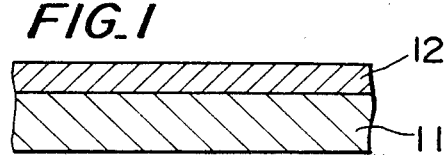
FIG_1
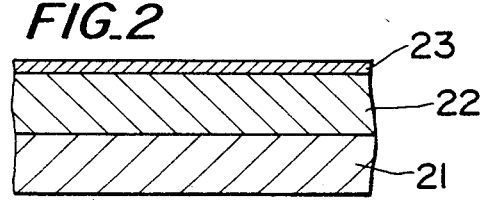
FIG_2
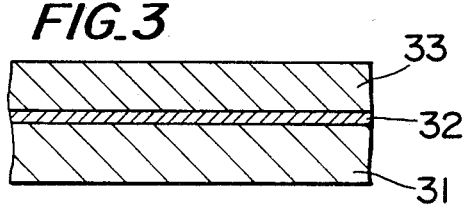
FIG_3
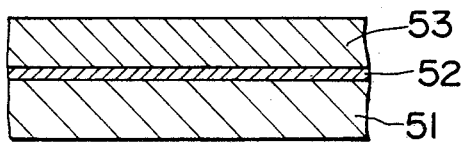
FIG_5

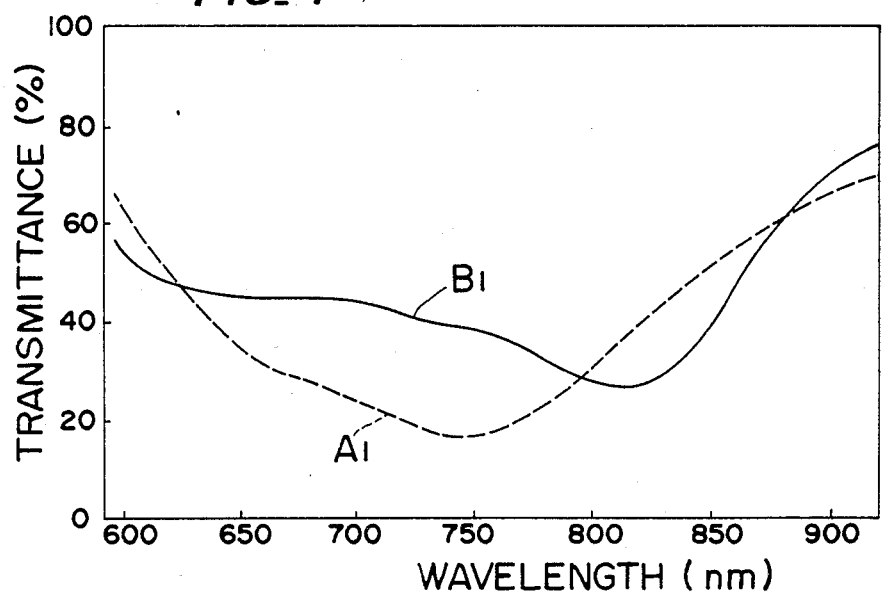
FIG_4
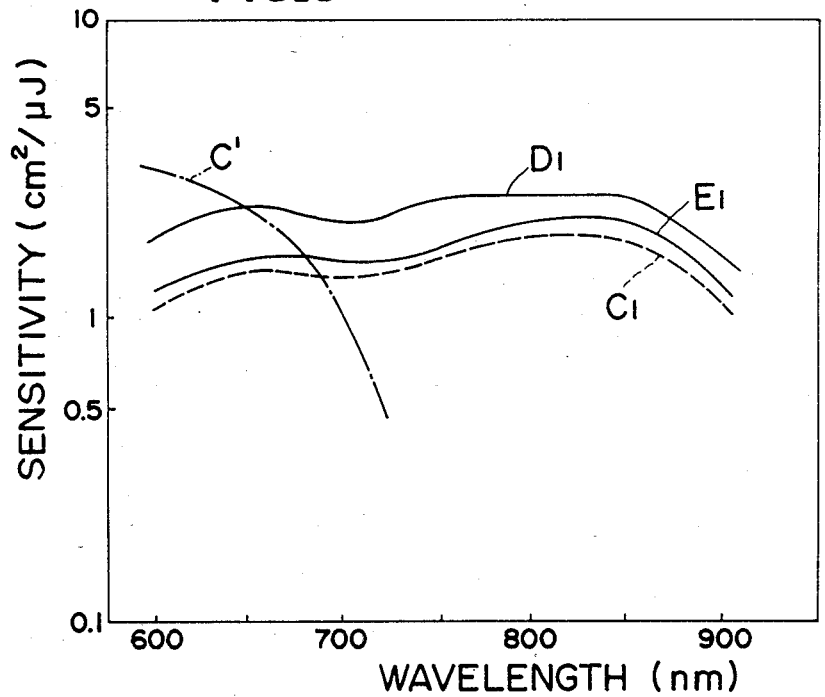
FIG_6

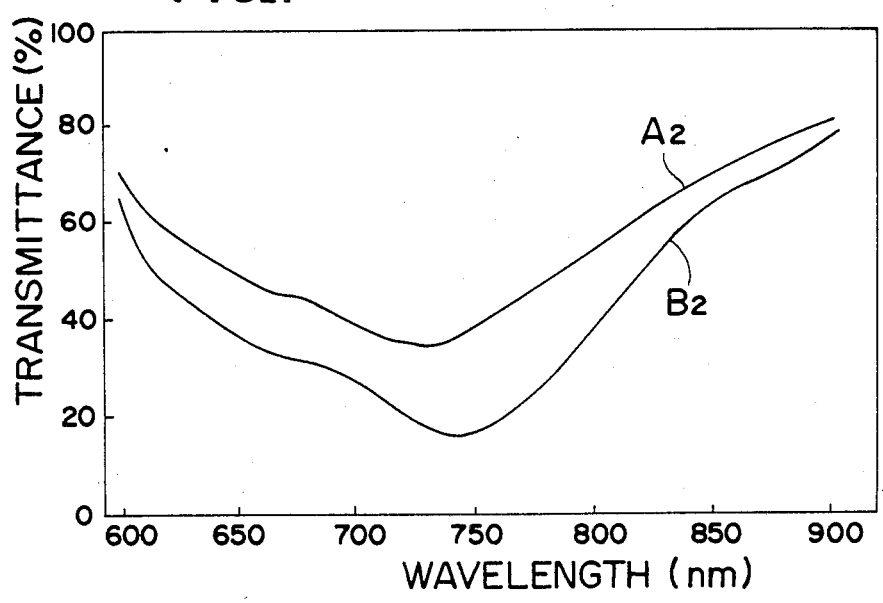
FIG_7
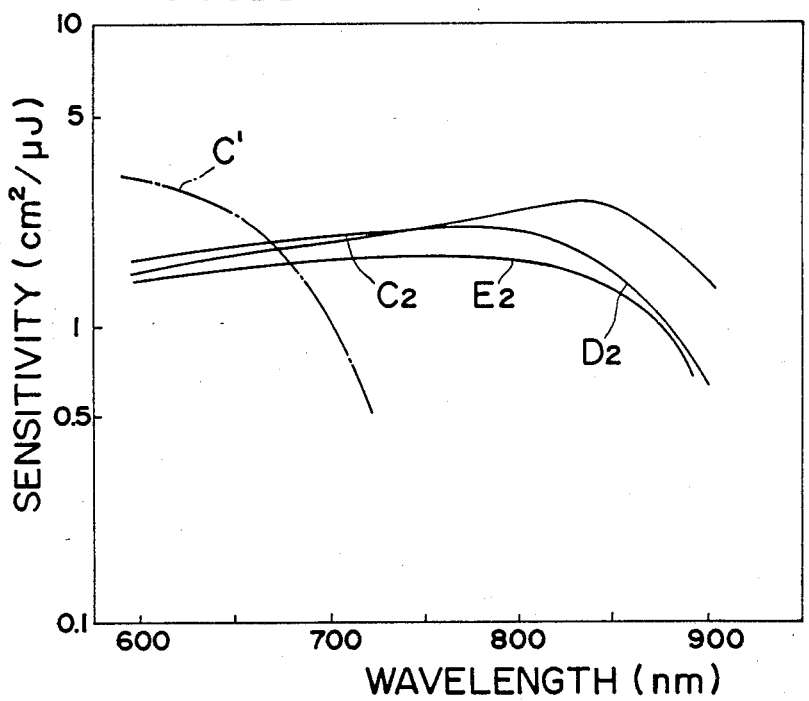
FIG_8

FIG_13
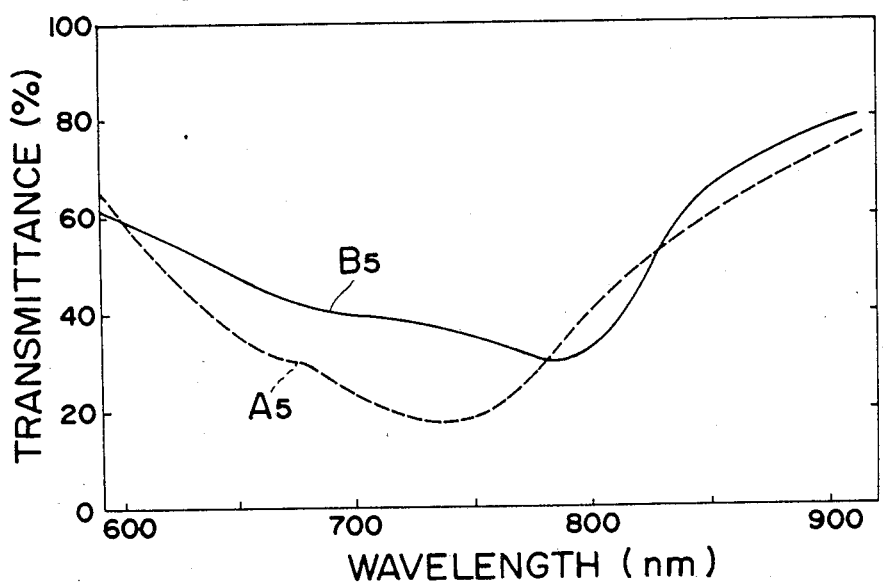
FIG_14
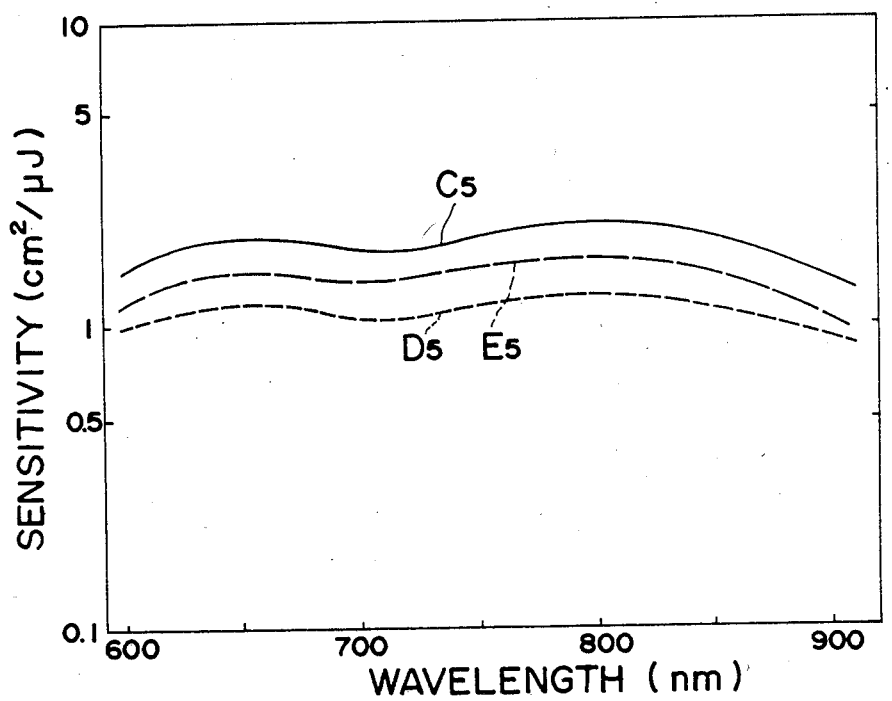

PHTHALOCYANINE PHOTOCONDUCTOR FOR ELECTROPHOTOGRAPHY

BACKGROUND OF THE INVENTION

1. Field of the Invention

The present invention relates to photoconductors for electrophotography, and particularly to photoconductors having excellent physical characteristics and indicating high sensitivity with respect to light of a long wavelength of around 800 nm.

2. Description of the Prior Art

As conventional photoconductors for electrophotography, such a photoconductor wherein a selenium (Se) film 12 of around 50 μm is formed on a photoconductive substrate 11 made of, for instance, aluminum or the like in accordance with vacuum deposition method as shown in FIG. 1 has been proposed. In this case, however, there are such disadvantages in that about one hour is required for the selenium deposition and that the Se photoconductor has sensitivity of a wavelength of only up to around 500 nm. As shown in FIG. 2, there has been also proposed another photoconductor in which a Se layer 22 of around 50 μm is formed on a photoconductive substrate 21, and a selenium-tellurium (Se-Te) alloy layer 23 of several μm is further formed thereon. In this photoconductor, the higher Te content in the above Se-Te alloy results in the higher spectral sensitivity, in other words, such sensitivity extends up to long wavelength, whilst whose surface charge retention characteristics become inferior with increase in amount of Te added, and thus it brings about such a serious problem that the photoconductor of this type cannot actually be utilized as a photosensitive material. FIG. 6 is a graphical representation illustrating spectral sensitivity of a layered photoconductor system which is prepared, as described in detail hereinbelow, by forming a Se layer having 50 μm thickness on an aluminum substrate, and further forming 3 μm Se-Te alloy consisting of 85 mol% of Se and 15 mol% of Te thereon. In this case, the amount of Te added is substantially limited to such extent as described above, besides this photoconductor system has sensitivity of up to only around 700 nm (curve C').

Furthermore, there has been proposed a photoconductor of so-called separated function type as shown in FIG. 3 which consists of a carrier generation layer 32 prepared by coating chlorodianeblue or a squaric acid derivative on an aluminum substrate 31 with a thickness of around 1 μm and a carrier transport layer 33 formed by coating a mixture of polyvinylcarbazole or a pyrazoline derivative of high insulation resistance and polycarbonate resin on the carrier generation layer with a thickness of 10-20 μm. Spectral sensitivity characteristics of such separated function type photoconductor are determined on the basis of characteristics of the aforesaid carrier generation layer. In this respect, however, it is actual circumstances that such type of photoconductor has no sensitivity with respect to light of 700 nm or more at present.

Recently, various attempts have been made to utilize semiconductor laser as light source in a laser beam printer or the like wherein laser light is utilized as its light source and a photoconductor for electrophotography is employed. In this case, since wavelength of such light source as described above is around 800 nm, such a photoconductor having characteristic properties of high sensitivity with respect to long wavelength light of around 800 nm is strongly requested.

DETAILED DESCRIPTION OF THE INVENTION

As a result of repeating various studies upon the above-mentioned disadvantageous problems, the present inventors have acquired such findings that a separated function type photoconductor as described hereinbelow has high sensitivity with respect to light of the abovementioned wavelength of around 800 nm, besides the photoconductor of this type can inexpensively be manufactured, so that the present invention has been completed. A first embodiment of the separated function type photoconductor according to the present invention involves a carrier generation layer prepared from an organic photoconducting material having a basic structure corresponding to phthalocyanine having the following general formula:

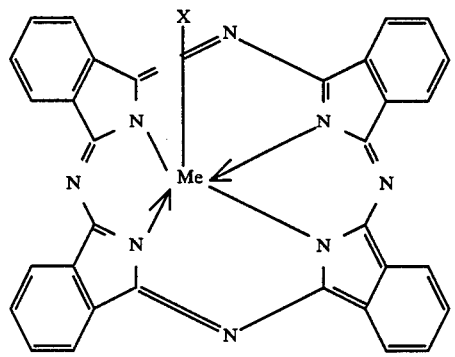

wherein Me positioned at the central portion of the formula (hereinafter referred to simply as "central metal") is selected from the group consisting of indium, gallium and aluminum, and X is halogen combined with said central metal (hereinafter referred to simply as "combined halogen"), and the aforesaid phthalocyanine is the one in which some hydrogen of benzene rings positioned around the phthalocyanine ring of the above basic structure are substituted by the same halogen with the aforesaid combined halogen.

In the present invention, a second embodiment of the separated function type photoconductor involves a carrier generation layer prepared from an organic photoconducting material which is a mixture consisting of phthalocyanine of a basic structure having the same general formula as indicated above wherein Me and X are as defined above, and another phthalocyanine in which some hydrogen of benzene rings positioned around the phthalocyanine ring of the aforesaid basic structure are substituted by the same halogen with the aforesaid combined halogen.

The present invention will more specifically be amplified hereinbelow.

The central metal of the invention is selected from indium, gallium and aluminum, whilst the combined halogen is chlorine or bromine. Examples of combination of the central metal with the combined halogen will be specifically described in the following Examples 1–15, but particularly favorable results were obtained in the just below combination.

| Central Metal | Combined Halogen |
| --- | --- |
| Indium | Chlorine |
| Gallium | Chlorine |
| Indium | Bromine |
| Aluminum | Bromine |
| Gallium | Bromine |

It is, however, to be noted that the combination is not necessarily be limited to the specific examples as listed above.

In the present invention, halogen substituted for some hydrogen of benzene rings positioned around the aforesaid phthalocyanine ring are the same ones with the aforesaid combined halogen. In this case, the substitution of halogen means substitution for more than one hydrogen of the aforesaid benzene ring. More specifically, although such a case wherein substantially one hydrogen is substituted by such a halogen will be described in detail in conjunction with the undermentioned respective examples, two or more hydrogen may be substituted by such halogen dependent upon type of synthesizing method.

Moreover, objects of the present invention can be attained with substantially equal advantageous effects, even though such phthalocyanine wherein two or more hydrogen of benzene rings have been substituted by such halogen is utilized.

BRIEF DESCRIPTION OF THE DRAWINGS

FIG. 1 is a sectional view showing an example of conventional photoconductor for electrophotography;

FIG. 2 is a sectional view showing an example of conventional Se-(Se-Te) layered photoconductive system for electrophotography;

FIG. 3 is a sectional view showing an example of conventional separated function type photoconductor for electrophotography;

FIG. 4 is a graphical representation indicating light absorption spectra of an example of the phthalocyanine utilized in the present invention;

FIG. 5 is a sectional view showing an example of the photoconductor according to the present invention;

FIG. 6 is a graphical representation indicating spectral sensitivity curves of the photoconductors in accordance with Examples 1, 2 and 3 of the present invention;

FIG. 7 is a graphical representation indicating light absorption spectra of the phthalocyanine utilized in Example 4 of the present invention;

FIG. 8 is a graphical representation indicating light absorption spectra of the photoconductors in accordance with Examples 4, 5 and 6 of the present invention;

FIG. 13 is a graphical representation indicating light absorption spectra of the phthalocyanine pigment utilized in Example 13; and FIG. 14 is a graphical representation indicating spectral sensitivity curves of the photoconductors in accordance with Examples 13, 14 and 15 of the invention.

Figure 9:
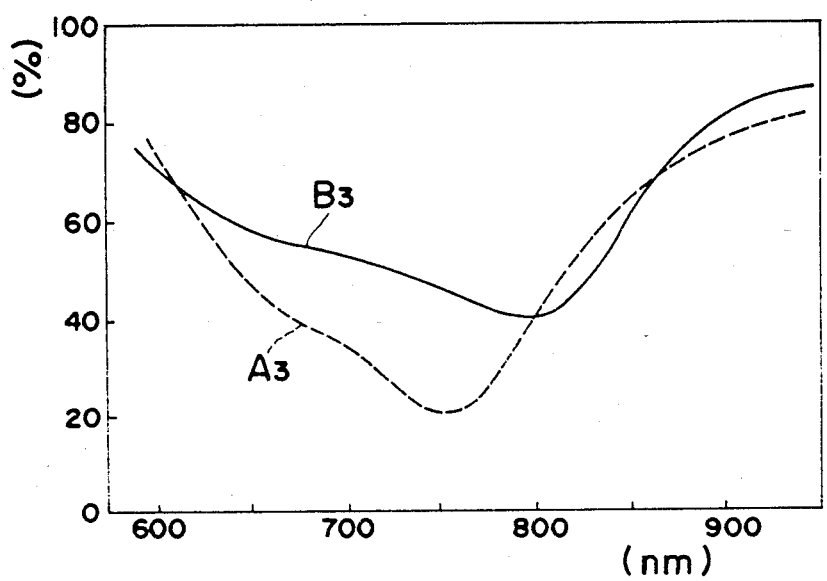
FIG. 9 is a graphical representation indicating light absorption spectra of the phthalocyanine pigment utilized in Example 7 of the invention.

The present invention will be described in detail hereinbelow in conjunction with specific examples.

EXAMPLE 1

12.8 g of o-phthalodinitrile (manufactured by Tokyo Kasei Co.) was reacted with 5.5 g of indium chloride ($InCl_3$) having 99.999% purity (manufactured by Furuuchi Kagaku Co.) while agitating them to admix the same in a beaker placed in a mantle heater of 300° C. in accordance with phthalonitrile method thereby to synthesize a mixture of a compound having basic structure being the phthalocyanine having the above described general formula wherein central metal is indium and another phthalocyanine wherein some hydrogen of benzene rings positioned around the phthalocyanine ring of said basic structure are substituted by chlorine. The resulting product was a bluish black lump. The lump was finely divided and purified. As a result of analysis of chlorine content of the resulting phthalocyanine in accordance with combustion flask method, it was found that the amount of chlorine was 1.75 per one molecule of phthalocyanine and one chlorine of which was combined with the indium of central metal, so that such chlorine which were substituted for hydrogen of benzene rings positioned around the phthalocyanine ring were average 0.75. Thus, it was clear that the synthesized phthalocyanine was a mixture consisting of phthalocyanine of the above basic structure and another phthalocyanine wherein some hydrogen of the above-mentioned benzene rings are substituted by chlorine.

Then, 10 mg of the phthalocyanine product was placed in an alumina crucible within a vacuum metallizer and a temperature of the crucible was maintained at 400° C. in accordance with resistance heating vapor deposition method to form a thin film of 0.02 $\mu m$ on a glass plate. Light absorption spectrum of the resulting thin film was measured with respect to light of 600–900 nm by means of an automatic recording spectrophotometer and the results thereof with indicated by curve $A_1$ in FIG. 4. As is apparent from the graphical representation, the absorption spectrum of the thin film showed shoulder peak and maximum peak at 670 nm and 750 nm, respectively.

The above thin film sample was exposed in tetrahydrofuran vapor for 20 hours, and the light absorption spectrum was similarly investigated. As a result, the aforesaid absorption peak shifted to longer wavelength region, in other words, the maximum peak shifted to a point of 810 nm as indicated by curve $B_1$ in FIG. 4.

Next, an alumina crucible was filled with 0.1 g of the phthalocyanine product prepared specifically as described above, and the product contained in the alumina crucible was subjected to resistance heating vapor deposition for about 20 minutes while maintaining a temperature of the crucible at 400° C. to form a carrier generation layer 52 (0.2 $\mu m$) on an aluminum substrate 51 as shown in the structure of FIG. 5. The resulting material was exposed in tetrahydrofuran vapor for 20 hours, then, the so exposed material was coated with polyvinylcarbazole resin (manufactured by Tokyo Kasei Co., special grade) dissolved in tetrahydrofuran, and the material thus coated was sufficiently dried to remove tetrahydrofuran, whereby a carrier transport layer 53 (6 $\mu m$ thickness) was formed on the carrier generation layer to obtain a photoconductor.

Results obtained by measuring spectral sensitivity representing electrophotographic characteristic properties of the resulting photoconductor were indicated by curve $C_1$ in FIG. 6.

As is apparent from FIG. 6, a very high sensitivity more than 1 cm$^2$/μJ was observed even at 900 nm and further a high sensitivity of 2.0 cm$^2$/μJ was observed at 800–850 nm in respect of the photoconductor. It is very advantageous to utilize the photoconductor having such characteristic properties as described above for apparatuses such as laser beam printer and the like in which semiconductor laser is employed as its light source.

EXAMPLE 2

0.2 μm of a thin film was formed on an aluminum substrate by employing the phthalocyanine product prepared in Example 1 in accordance with vacuum deposition. The resulting material was coated with tetrahydrofuran solution of polyvinylcarbazole without accompanying tetrahydrofuran solvent vapor treatment to form a carrier transport layer having a dry thickness of 6 μm, whereby a photoconductor was obtained.

Spectral sensitivity of the resulting photoconductor was measured and the result thereof was indicated by curve $D_1$ in FIG. 6. According to FIG. 6, it is clear that the photoconductor shows a higher sensitivity than that of Example 1 at up to a wavelength of 850 nm as a whole, particularly in the present example, such high sensitivity of 2.5 cm$^2$/μJ and 1.5 cm$^2$/μJ are observed at 750–800 nm and 900 nm, respectively, and this means that the photoconductor obtained is very suitable for the one to be utilized in the aforesaid laser beam printer wherein particularly a light source of around 800 nm is used.

Since the photoconductor according to Example 2 is prepared without accompanying solvent vapor treatment, there is an advantage in that the manufacturing process can be simplified.

EXAMPLE 3

In accordance with similar manner to that of Example 2, the aforesaid phthalocyanine product was employed to form a film of 0.2 μm as a carrier generation layer on an aluminum substrate according to vacuum deposition method, and a carrier transport layer was further formed on the carrier generation layer by coating the same (with a film thickness of 8 μm) with a solution prepared by dissolving 1:1 mixture, in weight ratio, of 1-phenyl-3-(4'-diethylaminostyryl)-5-(4'''-diethylaminophenyl)-2-pyrazoline in pyrazoline derivatives and phenoxy resin (manufactured by Union Carbide Corp.) into tetrahydrofuran. In this case, the pyrazoline derivatives are the ones which were synthesized in accordance with a method wherein pentadiene-2-one is prepared from benzaldehyde and acetone, and the resulting pentadiene-2-one is reacted with phenylhydrazine.

Spectral sensitivity of the resulting photoconductor was measured and the result thereof was indicated by curve $E_1$ in FIG. 6. As is understood from FIG. 6, it became clear that substantially same spectral sensitivity with that of Example 2 was obtained in the photoconductor according to the present example and even if the pyrazoline derivatives were utilized for the carrier transport layer, such photoconductor showing high sensitivity of 2 cm$^2$/μJ and 1 cm$^2$/μJ at 750–850 nm and 900 nm, respectively, could be obtained.

Accordingly, the present photoconductor is also very suitable for use in a laser beam printer wherein a light source of around 750–850 nm is utilized.

EXAMPLE 4

12.8 g of o-phthalodinitrile (manufactured by Tokyo Kasei Co.) was reacted with 4.4 g of gallium chloride (GaCl$_3$) having 99.999% purity (manufactured by Furuuchi Kagaku Co.) while agitating them to admix the same in a beaker placed in a mantle heater of 300° C. in accordance with phthalonitrile method to synthesize a mixture of a compound having basic structure being the phthalocyanine having the above described general formula wherein central metal is gallium and another phthalocyanine wherein some hydrogen of benzene rings positioned around the phthalocyanine ring of said basic structure are substituted by chlorine. The resulting product was a bluish black lump. The lump was finely divided and then, purified by washing the fine power with tetrahydrofuran (THF) to remove THF soluble matter. As a result of analysis of chlorine content of the resulting phthalocyanine in accordance with combustion flask method, it was found that the amount of chlorine was 2.26 per one molecule of phthalocyanine and one chlorine of which was combined with the gallium of central metal, so that such chlorine which were substituted for hydrogen of benzene rings positioned around the phthalocyanine ring were average 1.26.

Then, 10 mg of the phthalocyanine product was placed in an alumina crucible within a vacuum metallizer and a temperature of the crucible was maintained at 400° C. in accordance with resistance heating vapor deposition method to form a thin film of 0.02 μm on a glass plate. Light absorption spectrum of the resulting thin film was measured with respect to light of 600–900 nm by means of an automatic recording spectrophotometer and the results thereof were indicated by curve $A_2$ in FIG. 7. As is apparent from the graphical representation, the absorption spectrum of the thin film showed shoulder peak and maximum peak at 670 nm and 730 nm, respectively.

The above thin film sample was exposed in tetrahydrofuran vapor for 20 hours, and the light absorption spectrum was similarly investigated. As a result, the aforesaid absorption peak shifted to longer wavelength region, in other words, the maximum peak shifted to a point of 745 nm as indicated by curve $B_2$ in FIG. 7.

Next, an alumina crucible was filled with 0.1 g of the phthalocyanine product prepared specifically as described above, and the product contained in the alumina crucible was subjected to resistance heating vapor deposition for about 20 minutes while maintaining a temperature of the crucible at 400° C. to form a carrier generation layer 52 (0.2 μm) on an aluminum substrate 51 as shown in the structure of FIG. 5. The resulting material was exposed in tetrahydrofuran vapor for 20 hours, then, the so exposed material was coated with polyvinylcarbazole resin (manufactured by Tokyo Kasei Co., spectral grade) dissolved in tetrahydrofuran, and the material thus coated was sufficiently dried up to remove tetrahydrofuran whereby a carrier transport layer 53 (6 μm thickness) was formed on the carrier generation layer to obtain a photoconductor.

Results obtained by measuring spectral sensitivity representing electrophotographic characteristic properties of the resulting photoconductor were indicated by curve $C_2$ in FIG. 8.

As is apparent from FIG. 8, a very high sensitivity more than 1 cm$^2$/μJ was observed even at 900 nm and further a high sensitivity of 2.5 cm$^2$/μJ was observed at 800 nm in respect of the photoconductor. Such photoconductor having substantially flat characteristic properties in a region of 600–900 nm is scarcely known at present, so that the present photoconductor is very advantageous for use in the above-mentioned apparatuses such as laser beam printer and the like.

EXAMPLE 5

0.2 μm of a thin film was formed on an aluminum substrate by employing the phthalocyanine product prepared in Example 4 in accordance with vacuum deposition. The resulting material was coated with tetrahydrofuran solution of polyvinylcarbazole without accompanying tetrahydrofuran solvent vapor treatment to form a carrier transport layer having a dry thickness of 6 μm, whereby a photoconductor was obtained.

Spectral sensitivity of the resulting photoconductor was measured and the result thereof was indicated by curve $D_2$ in FIG. 8. According to FIG. 8, it became clear that the photoconductor obtained showed substantially equal high sensitivity of 1–1.5 cm$^2$/μJ to that of the photoconductor in Example 4 at up to a wavelength of 850 nm. In the present example, however, the sensitivity decreased about ½ that of the photoconductor of Example 4 at around 900 nm. Except that the sensitivity is somewhat lower than that of the photoconductor in Example 4 at around 900 nm, the photoconductor of the present example is substantially equal to that of Example 4, so that it is apparent that the photoconductor obtained in Example 5 is very suitable for the one to be utilized in the aforesaid laser beam printer wherein a light source of around 800 nm is used.

Since the photoconductor according to Example 5 is prepared without accompanying solvent vapor treatment, there is an advantage in that the manufacturing process can be simplified.

EXAMPLE 6

In accordance with similar manner to that of Example 5, the aforesaid phthalocyanine product was employed to form a film of 0.2 μm as carrier generation layer on an aluminum substrate according to vacuum deposition method, and a carrier transport layer was further formed on the carrier generation layer by coating the same (with a film thickness of 8 μm) with a solution prepared by dissolving 1:1 mixture, in weight ratio, of 1-phenyl-3-(4'-diethylaminostyryl)-5-(4''-diethylaminophenyl)-2-pyrazoline in pyrazoline derivatives and phenoxy resin (manufactured by Union Carbide Corp.) into tetrahydrofuran. In this case, the pyrazoline derivatives are the ones which were synthesized in accordance with a method wherein pentadiene-2-one is prepared from benzaldehyde and acetone, and the resulting pentadiene-2-one is reacted with phenylhydrazine.

Spectral sensitivity of the resulting photoconductor was measured and the result thereof was indicated by curve $E_2$ in FIG. 6. As is understood from FIG. 6, it became clear that substantially same spectral sensitivity with that of Example 2 was obtained in the photoconductor according to the present example and even if the pyrazoline derivatives were utilized for the carrier transport layer, such photoconductor showing high sensitivity could be obtained.

Accordingly, the present photoconductor is also very suitable for use in a laser beam printer wherein a light source of around 800 nm is utilized.

EXAMPLE 7

12.8 g of o-phthalodinitrile was reacted with 8.88 g of indium bromide InBr$_3$ having 99.999% purity while agitating them to admix the same in a beaker placed in a mantle heater of 300° C.

It was confirmed that the structure of the resulting product was phthalocyanine having the aforesaid general formula. More specifically, as a result of elementary analysis of the product, it was confirmed that the elemental ratio thereof was $C_{32}H_{15.2}N_{7.8}Br_{1.9}In_{1.0}$, so that the resulting product was phthalocyanine having the general formula as indicated above as well as substantial elemental ratio of $C_{32}H_{15}N_8Br_2In_1$ and one Br of which was combined with the central metal of the aforesaid general formula, whilst the remaining one Br was combined with benzene ring positioned around the phthalocyanine ring.

Then, 0.01 g of the phthalocyanine product was placed in an alumina crucible within a vacuum metallizer and a temperature of the crucible was maintained at 400° C. in accordance with resistance heating vapor deposition method to form a thin film (0.02 μm film thickness). Light absorption spectrum of the resulting thin film sample was measured with respect to light of 600–900 nm by means of an automatic recording spectrophotometer and the results thereof were indicated in FIG. 9. Curve $A_3$ in FIG. 9 was the spectrum of the aforesaid thin film sample itself and it showed the maximum peak at 750 nm.

The thin film sample was further subjected to exposure treatment in tetrahydrofuran (THF) vapor for 20 hours to form another sample and the absorption peak of the spectrum of which shifted to longer wavelength side as shown in curve $B_3$. More specifically, the maximum peak of which shifted to a point of 795 nm as in curve $B_3$.

Next, the aforesaid phthalocyanine product was subjected to resistance heating vapor deposition to form a carrier generation layer 52 of 0.2 μm film thickness on an aluminum substrate 51 as shown in FIG. 5. The carrier generation layer was exposed in THF vapor for 20 hours, then, polyvinylcarbazole resin for electrophtography dissolved in THF was applied thereon, and the carrier generation layer thus applied was sufficiently dried to remove the THF, thereby to form a carrier transport layer 53 (10 μm thickness) so that a photoconductor was obtained.

Figure 10:
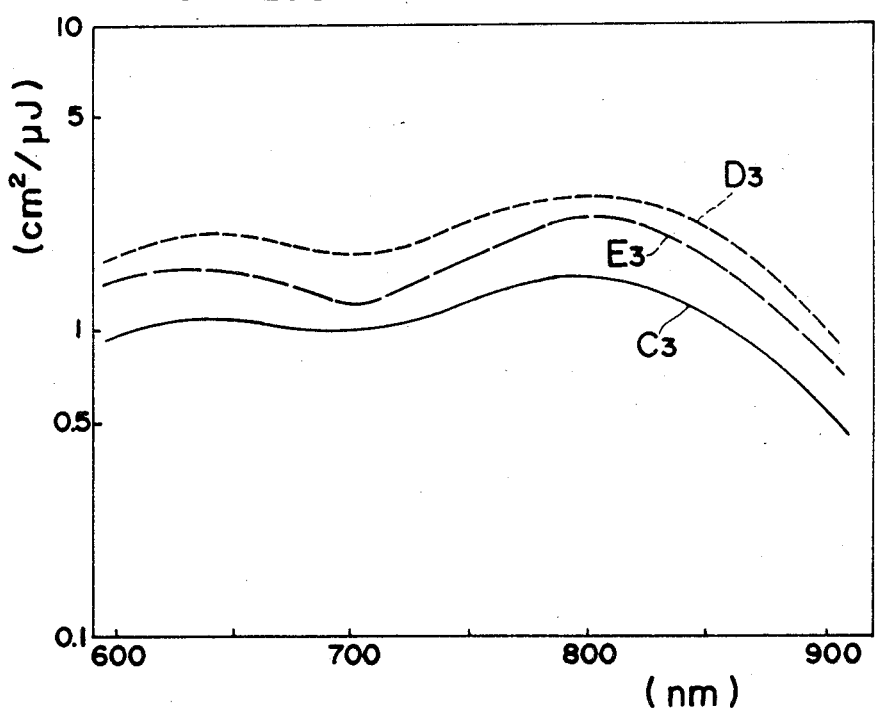
FIG. 10 is a graphical representation indicating spectral sensitivity curves of the photoconductors in accordance with Examples 7, 8 and 9 of the invention.

Results obtained by measuring spectral sensitivity representing electrophotographic characteristic properties of the resulting photoconductor were indicated by curve $C_3$ in FIG. 10.

According to FIG. 10, a very high sensitivity more than 1 cm$^2$/μJ was observed at even a wavelength of 850 nm and further such a sufficient high sensitivity of 1–1.5 cm$^2$/μJ was observed at 800–850 nm corresponding to wavelength of the above-mentioned general semiconductor laser light in respect of the photoconductor prepared in the present example.

EXAMPLE 8

In accordance with the procedure of Example 7, the same phthalocyanine was utilized for forming a film of 0.2 μm on an aluminum substrate according to vacuum vapor deposition method, and then, the film was coated with THF solution of polyvinylcarbazole to form a carrier transport layer having a dry thickness of 8 μm without accompanying the THF solvent vapor treatment of Example 7, whereby a photoconductor was obtained.

Spectral sensitivity of the photoconductor prepared in Example 8 was measured by the similar manner to that mentioned in the above Examples, and the results thereof were indicated by curve $D_3$ in FIG. 10. According to curve $D_3$, it became clear that in comparison with the photoconductor prepared by subjecting the carrier generation layer of Example 7 to THF solvent vapor treatment, the present photoconductor of Example 8 showed such high sensitivity of 2-3 $cm^2/\mu J$ at a wavelength of 800-850 nm and 1 $cm^2/\mu J$ at even 900 nm, respectively. Namely, the present photoconductor of Example 8 shows very high sensitivity, even if solvent vapor treatment has not been effected on the carrier generation layer so that the present photoconductor is more suitable for the one to be employed in the above described laser beam printer wherein such a semiconductor laser oscillating light of 800-850 nm is utilized as its light source. In addition, since the photoconductor of this Example is prepared without accompanying solvent vapor treatment, there is an advantage in that the manufacturing process thereof can be simplified.

EXAMPLE 9

In accordance with the similar procedure to that of Example 7, the same phthalocyanine was utilized for forming a carrier generation layer having 0.2 μm thickness on an aluminum substrate according to vacuum vapor deposition method. Then, without applying THF solvent vapor treatment, a film (the dried film thickness being 10 μm) was further formed on the carrier generation layer by coating the same with a solution prepared by dissolving 1:1 mixture, in weight ratio, of 1-phenyl-3-(4'-diethylaminostyryl)-5-(4''-diethylaminophenyl)-2-pyrazoline in pyrazoline derivatives and phenoxy resin (manufactured by Union Carbide Corp.) into THF. In this case, the pyrazoline derivatives were synthesized by such a manner that pentadiene-2-one is prepared from benzaldehyde and acetone, and the resulting pentadiene-2-one is reacted with phenylhydrazine.

Spectral sensitivity of the resulting photoconductor was measured by the similar manner to those described above and the result thereof was indicated by curve $E_3$ in FIG. 10. The resulting photoconductor showed substantially same high sensitivity of 1.5-2.5 $cm^2/\mu J$ at a wavelength of 800-850 nm and 0.8 $cm^2/\mu J$ at a wavelength of 900 nm with those of Examples 7 and 8, respectively. According to Example 9, even if the carrier transport layer of Example 8 is made from a pyrazoline derivative, a photoconductor of high sensitivity can be obtained so that the present photoconductor was very suitable when used in a laser beam printer, as its photoconductor, wherein a light source having such a light wavelength of 800-850 nm as mentioned above is employed.

EXAMPLE 10

12.8 g of o-phthalodinitrile was reacted with 6.68 g of aluminum bromide $AlBr_3$ having 99.999% purity while agitating them to admix the same in a beaker placed in a mantle heater of 300° C.

It was confirmed that the structure of the resulting product was phthalocyanine having the aforesaid general formula. More specifically, as a result of elementary analysis of the product, it was confirmed that the elemental ratio thereof was $C_{32}H_{15.5}N_{7.8}Br_{2.2}Al_{1.1}$, so that the resulting product was phthalocyanine having the general formula as indicated above as well as substantial elemental ratio $C_{32}H_{15}N_8Br_2Al_1$ and one Br of which was combined with the central metal of the aforesaid general formula, whilst the remaining one Br was combined with benzene ring positioned around the phthalocyanine ring.

Figure 11:
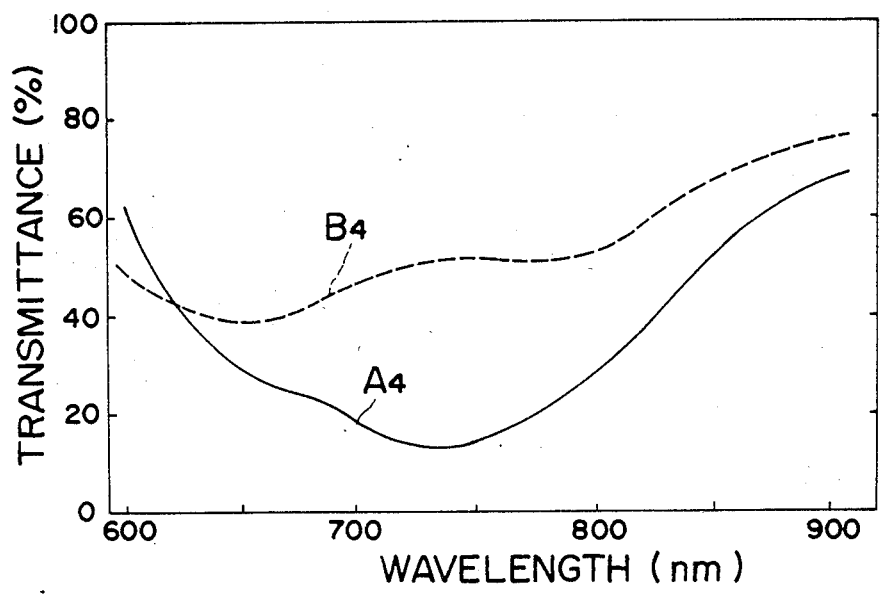
FIG. 11 is a graphical representation indicating light absorption spectra of the phthalocyanine pigment utilized in Example 10.

Then, 0.01 g of the phthalocyanine product was placed in an aluminum crucible within a vacuum metallizer and a temperature of the crucible was maintained at 400° C. in accordance with resistance heating vapor deposition method to form a thin film (0.02 μm film thickness). Light absorption spectrum of the resulting thin film sample was measured with respect to light of 600-900 nm by means of an automatic recording spectrophotometer and the result thereof was indicated in FIG. 11. Curve $A_4$ in FIG. 11 was the spectrum of the aforesaid thin film sample itself and it showed the maximum peak at 730 nm.

The thin film sample was further subjected to exposure treatment in tetrahydrofuran (THF) vapor for 20 hours to form another sample and the spectrum of which turned into the one having absorption peaks at 650 nm and 780 nm, respectively, as shown in Curve $B_4$.

Next, the aforesaid phthalocyanine product was subjected to resistance heating vapor deposition to form a carrier generation layer 52 of 0.2 μm film thickness on an aluminum substrate 51 as shown in FIG. 5. The carrier generation layer was exposed in THF vapor for 20 hours, then, polyvinylcarbazole resin for electrophotography dissolved in THF was applied thereon, and the carrier generation layer thus applied was sufficiently dried to remove the THF, thereby to form a carrier transport layer 53 (12 μm thickness) so that a photoconductor was obtained.

Figure 12:
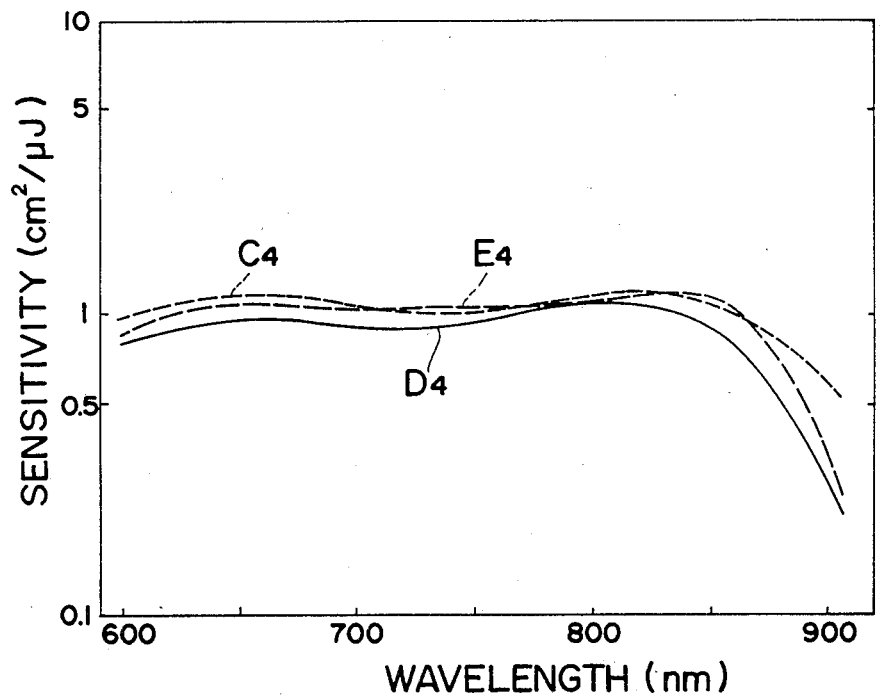
FIG. 12 is a graphical representation indicating spectral sensitivity curves of the photoconductors in accordance with Examples 10, 11 and 12 of the invention.

Results obtained by measuring spectral sensitivity representing electrophotographic characteristic properties of the resulting photoconductor were indicated by curve $C_4$ in FIG. 12.

According to FIG. 12, a high sensitivity of 0.6 $cm^2/\mu J$ was observed at even a wavelength of 900 nm and further such a sufficient high sensitivity of 1 $cm^2/\mu J$ was observed at 800-850 nm corresponding to wavelength of the above-mentioned general semiconductor laser light in respect of the photoconductor prepared in the present example.

EXAMPLE 11

In accordance with the procedure of Example 10, the same phthalocyanine as described above was utilized for forming a film of 0.2 μm on an aluminum substrate according to vacuum vapor deposition method, and then, the film was coated with THF solution of polyvinylcarbazole to form a carrier transport layer having a dry thickness of 12 μm without accompanying the THF solvent vapor treatment of Example 10, whereby a photoconductor was obtained.

Spectral sensitivity of the photoconductor prepared in Example 11 was measured by the similar manner to that mentioned in the above Examples, and the results thereof were indicated by curve $D_4$ in FIG. 12. According to curve $D_4$, it became clear that in comparison with the photoconductor prepared by subjecting the carrier generation layer of Example 10 to THF solvent vapor treatment, the present photoconductor of Example 11 showed somewhat low sensitivity at a wavelength of 900 nm, but high sensitivity of 1 cm$^2$/μJ at 800–850 nm. Namely, the present photoconductor of Example 11 shows very high sensitivity, even if solvent vapor treatment has not been effected on the carrier generation layer so that the present photoconductor is more suitable for the one to be employed in the above described laser beam printer wherein such a semiconductor laser oscillating light of 800–850 nm is utilized as its light source. In addition, since the photoconductor of this Example is prepared without accompanying solvent vapor treatment, there is an advantage in that the manufacturing process thereof can be simplified.

EXAMPLE 12

In accordance with the similar procedure to that of Example 10, the same phthalocyanine as described above was utilized for forming a carrier generation layer having 0.2 μm thickness on an aluminum substrate according to vacuum vapor deposition method. Then, without applying THF solvent vapor treatment, a film (the dried film thickness being 10 μm) was further formed on the carrier generation layer by coating the same with a solution prepared by dissolving 1:1 mixture, in weight ratio, of 1-phenyl-3-(4'-diethylaminostyryl)-5-(4''-diethylaminophenyl)-2-pyrazoline in pyrazoline derivatives and phenoxy resin (manufactured by Union Carbide Corp.) into THF. In this case, the pyrazoline derivatives were synthesized by such a manner that pentadiene-2-one is prepared from benzaldehyde and acetone, and the resulting pentadiene-2-one is reacted with phenylhydrazine.

Spectral sensitivity of the resulting photoconductor was measured by the similar manner to those described above and the result thereof was indicated by curve $E_4$ in FIG. 12. The resulting photoconductor showed substantially same high sensitivity of 1 cm$^2$/μJ at a wavelength of 800–850 nm with those of Examples 10 and 11, respectively. According to Example 12, even if the carrier transport layer of Example 11 is made from a pyrazoline derivative, a photoconductor of high sensitivity can be obtained so that the present photoconductor was very suitable when used in a laser beam printer, as its photoconductor, wherein a light source having such a light wavelength of 800–850 nm as mentioned above is employed.

EXAMPLE 13

12.8 g of o-phthalodinitrile was reacted with 7.7 g of gallium bromide GaBr$_3$ having 99.999% purity while agitating them to admix the same in a beaker placed in a mantle heater of 300° C. The resulting product could be separated with tetrahydrofuran (THF) into soluble and insoluble matters. The resulting insoluble matter was further washed with THF and the matter so washed was subjected to sublimation and purification.

As a result, it was confirmed that the structure of the THF insoluble part thus obtained was phthalocyanine having the aforesaid general formula. More specifically, as a result of elementary analysis of the product, it was confirmed that the elemental ratio thereof was $C_{32}H_{14.8}N_{7.8}Br_{2.0}Ga_{1.2}$, so that the resulting product was phthalocyanine having the general formula as indicated above as well as substantial elemental ratio $C_{32}H_{15}N_8Br_2Ga_1$ and one Br of which was combined with the central metal of the aforesaid general formula, whilst the remaining one Br was combined with benzene ring positioned around the phthalocyanine ring.

Then, 0.01 g of the phthalocyanine product was placed in an alumina crucible within a vacuum metallizer and a temperature of the crucible was maintained at 400° C. in accordance with resistance heating vapor deposition method to form a thin film (0.02 μm film thickness). Light absorption spectrum of the resulting thin film sample was measured with respect to light of 600–900 nm by means of an automatic recording spectrophotometer and the results thereof were indicated in FIG. 13. Curve $A_5$ in FIG. 13 was the spectrum of the aforesaid thin film sample itself and it showed the maximum peak at 740 nm.

The thin film sample was further subjected to exposure treatment in tetrahydrofuran (THF) vapor for 20 hours to form another sample and the absorption peak of the spectrum of which shifted to longer wavelength side as shown in curve $B_5$. More specifically, the maximum peak of which shifted to a point of 785 nm as in curve $B_5$.

Next, the aforesaid phthalocyanine product was subjected to resistance heating vapor deposition to form a carrier generation layer 52 of 0.2 μm film thickness on an aluminum substrate 51 as shown in FIG. 5. The carrier generation layer was exposed in THF vapor for 20 hours, then, polyvinylcarbazole resin for electrophotography dissolved in THF was applied thereon, and the carrier generation layer thus applied was sufficiently dried to remove the THF, thereby to form a carrier transport layer 53 (10 μm thickness) so that a photoconductor was obtained.

Results obtained by measuring spectral sensitivity representing electrophotographic characteristic properties of the resulting photoconductor were indicated by curve $C_5$ in FIG. 14.

According to FIG. 14, a very high sensitivity more than 1.5 cm$^2$/μJ was observed at even a wavelength of 900 nm and further such a very high sensitivity of about 2 cm$^2$/μJ was observed at 800–850 nm corresponding to wavelength of the above-mentioned usual semiconductor laser light in respect of the photoconductor prepared in the present Example.

EXAMPLE 14

In accordance with the procedure of Example 13, the same phthalocyanine was utilized for forming a film of 0.2 μm on an aluminum substrate according to vacuum vapor deposition method, and then, the film was coated with THF solution of polyvinylcarbazole to form a carrier transport layer having a dry thickness of 10 μm without accompanying the THF solvent vapor treatment of Example 13, whereby a photoconductor was obtained.

Spectral sensitivity of the photoconductor prepared in Example 14 was measured by the similar manner to that mentioned in the above Examples, and the results thereof were indicated by curve $D_5$ in FIG. 14. According to curve $D_5$, it became clear that in comparison with the photoconductor prepared by subjecting the carrier generation layer of Example 13 to THF solvent vapor treatment, the present photoconductor of Example 14 showed somewhat low but considerably high, sensitivity of 1.5 cm$^2$/μJ and 1 cm$^2$/μJ at a wavelength of 800–850 nm and 900 nm, respectively. Namely, the present photoconductor of Example 14 shows sufficiently high sensitivity, even if solvent vapor treatment has not been effected on the carrier generation layer so that the present photoconductor is more suitable for the one to be employed in the above described laser beam printer wherein such a semiconductor laser oscillating light of 800-850 nm is utilized as its light source. In addition, since the photoconductor of this Example is prepared without accompanying solvent vapor treatment, there is an advantage in that the manufacturing process thereof can be simplified.

EXAMPLE 15

In accordance with the similar procedure to that of Example 13, the same phthalocyanine was utilized for forming a carrier generation layer having 0.2 μm thickness on an aluminum substrate according to vacuum vapor deposition method. Then, without applying THF solvent vapor treatment, a film (the dried film thickness being 8 μm) was further formed on the carrier generation layer by coating the same with a solution prepared by dissolving 1:1 mixture, in weight ratio, of 1-phenyl-3-(4'-diethylaminostyryl)-5-(4''-diethylaminophenyl)-2-pyrazoline in pyrazoline derivatives and phenoxy resin (manufactured by Union Carbide Corp.) into THF. In this case, the pyrazoline derivatives were synthesized by such a manner that pentadiene-2-one is prepared from benzaldehyde and acetone, and the resulting pentadiene-2-one is reacted with phenylhydrazine.

Spectral sensitivity of the resulting photoconductor was measured by the similar manner to those described above and the result thereof was indicated by curve $E_5$ in FIG. 14. The resulting photoconductor showed substantially same high sensitivity of 1.0–1.5 $cm^2/\mu J$ and 0.9 $cm^2/\mu J$ at a wavelength of 800–850 nm and 900 nm, respectively, with those of Examples 13 and 14. According to Example 15, even if the carrier transport layer of Example 14 is made from a pyrazoline derivative, a photoconductor of high sensitivity can be obtained so that the present photoconductor was very suitable when used in a laser beam printer as its photoconductor, wherein a light source having such a light of 800–850 nm as mentioned above is employed.

In the photoconductor according to the present invention, such a very thin film of, for example, around 0.2 μm is sufficient for the carrier generation layer as described above and accordingly, only a short period of time is required for operating a vacuum device in respect of manufacturing of photoconductors so that such manufacturing of the photoconductors becomes easy and the photoconductors can inexpensively be mass produced. Furthermore, since principal raw materials of the photoconductor are organic substances, there is not so much problem in respect of disposal thereof. Besides there is such an advantage that the photoconductor of the present invention is not only applicable for laser beam printer, but also optical sensor and other recording devices such as facsimile or printer wherein LED, particularly semiconductor laser is utilized as its light source.

What is claimed is:

1. In a layered photoconductor for electrophotography, said photoconductor comprising:
    a carrier generation layer comprising an organic photoconducting material which absorbs light and generates carriers and
    a carrier transport layer which transports said carriers to said carrier generation layer,
    the improvement wherein said organic photoconducting material comprises a phthalocyanine having the following formula:

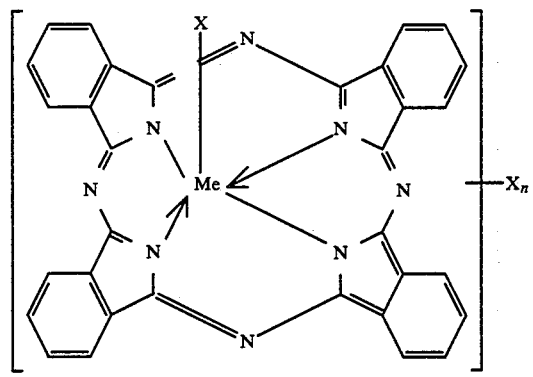

wherein Me is selected from the group consisting of indium and gallium, Me is indium or gallium X is chlorine or bromine, $X_n$ represents the same halogen as X but which is substituted in at least one benzene ring in the phthalocyanine nucleus and n is greater than 0.

2. The layered photoconductor according to claim 1 wherein n, as an average, is up to 2.

3. The layered photoconductor according to claim 1 wherein 2 or more hydrogens on said benzene rings are substituted by said halogens.

4. The layered photoconductor according to claim 1 wherein Me is indium and X is chlorine.

5. The layered photoconductor according to claim 1 wherein Me is indium and X is bromine.

6. The layered photoconductor according to claim 1 wherein the Me is gallium and X is chlorine.

7. The the layered photoconductor according to claim 1 wherein Me is gallium and X is bromine.

* * * * *